United States Patent
Shimozato et al.

(10) Patent No.: US 7,789,186 B2
(45) Date of Patent: Sep. 7, 2010

(54) ENGINE SUSPENSION DEVICE FOR MOTORCYCLE

(75) Inventors: Noriya Shimozato, Saitama (JP); Satoru Ikami, Saitama (JP); Yuichiro Morikawa, Saitama (JP); Jun Fujii, Saitama (JP); Susumu Michisaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 228 days.

(21) Appl. No.: 12/037,629

(22) Filed: Feb. 26, 2008

(65) Prior Publication Data

US 2008/0202840 A1 Aug. 28, 2008

(30) Foreign Application Priority Data

Feb. 28, 2007 (JP) ............................. 2007-049799

(51) Int. Cl.
*B62K 11/04* (2006.01)
(52) U.S. Cl. ...................................... 180/299; 180/228
(58) Field of Classification Search .................. 180/228, 180/227, 299, 65.1
See application file for complete search history.

(56) References Cited

U.S. PATENT DOCUMENTS

| | | | | |
|---|---|---|---|---|
| 3,542,146 A * | 11/1970 | Trigg et al. | ................ | 180/228 |
| 4,324,306 A * | 4/1982 | Ishihara et al. | ............. | 180/228 |
| 4,372,417 A * | 2/1983 | Yamamoto et al. | .......... | 180/215 |
| 4,373,602 A * | 2/1983 | Tomita et al. | ............... | 180/227 |
| 4,412,597 A * | 11/1983 | Aiba | ........................... | 180/228 |
| 4,424,877 A * | 1/1984 | Kawasaki | .................... | 180/210 |
| 4,487,285 A * | 12/1984 | Tomita et al. | ............... | 180/228 |
| 4,696,364 A * | 9/1987 | Enoki et al. | ................. | 180/228 |
| 4,724,921 A * | 2/1988 | Ohta et al. | .................. | 180/228 |
| 4,809,801 A * | 3/1989 | Enoki et al. | ................. | 180/228 |
| 5,390,758 A * | 2/1995 | Hunter et al. | ............... | 180/228 |
| 5,639,075 A * | 6/1997 | Tyree | .......................... | 267/281 |
| 6,588,530 B2 * | 7/2003 | Keller et al. | ................ | 180/228 |
| 6,695,087 B2 * | 2/2004 | Fournier et al. | ............. | 180/228 |
| 6,758,296 B2 * | 7/2004 | Inaoka et al. | ............... | 180/228 |
| 6,902,023 B2 * | 6/2005 | Brendelson et al. | ......... | 180/228 |
| 7,201,246 B2 * | 4/2007 | Brendelson et al. | ......... | 180/228 |
| 7,281,726 B2 * | 10/2007 | Satou | ......................... | 280/284 |
| 7,364,001 B2 * | 4/2008 | Inaoka et al. | ............... | 180/228 |

(Continued)

FOREIGN PATENT DOCUMENTS

EP      1 457 413 A2      9/2004

(Continued)

*Primary Examiner*—Jeffrey J Restifo
(74) *Attorney, Agent, or Firm*—Birch, Stewart, Kolasch & Birch, LLP

(57) ABSTRACT

An engine suspension device for a motorcycle can be increased in design flexibility and weight. An engine suspension device for a motorcycle has a suspension link provided between a body frame and an engine for pivotably supporting the engine. The suspension link includes a link body. Two pairs of right and left cylindrical members are provided at opposite ends of the link body and are connected to the body frame and the engine, respectively. The pairs of right and left cylindrical members are spaced apart from each other in the lateral direction of the motorcycle. The suspension link further includes a right connecting member for connecting the right cylindrical members and a left connecting member for connecting the left connecting members. The right and left connecting members are connected to each other by the link body.

18 Claims, 11 Drawing Sheets

U.S. PATENT DOCUMENTS

| | | | |
|---|---|---|---|
| 7,461,716 B2 * | 12/2008 | Hayashi et al. | 180/228 |
| 7,478,696 B2 * | 1/2009 | Ishida et al. | 180/219 |
| 7,490,688 B2 * | 2/2009 | Yamamoto | 180/228 |
| 7,681,680 B2 * | 3/2010 | Ishikawa et al. | 180/219 |
| 2004/0007409 A1 * | 1/2004 | Keller et al. | 180/228 |
| 2005/0178596 A1 * | 8/2005 | Brendelson et al. | 180/228 |
| 2005/0205328 A1 * | 9/2005 | Inaoka et al. | 180/228 |
| 2007/0074920 A1 * | 4/2007 | Hayashi et al. | 180/228 |
| 2008/0073140 A1 * | 3/2008 | Seger et al. | 180/227 |
| 2008/0202840 A1 * | 8/2008 | Shimozato et al. | 180/291 |
| 2008/0230293 A1 * | 9/2008 | Igarashi et al. | 180/227 |

FOREIGN PATENT DOCUMENTS

| | | |
|---|---|---|
| JP | 63-98295 U | 6/1988 |

* cited by examiner

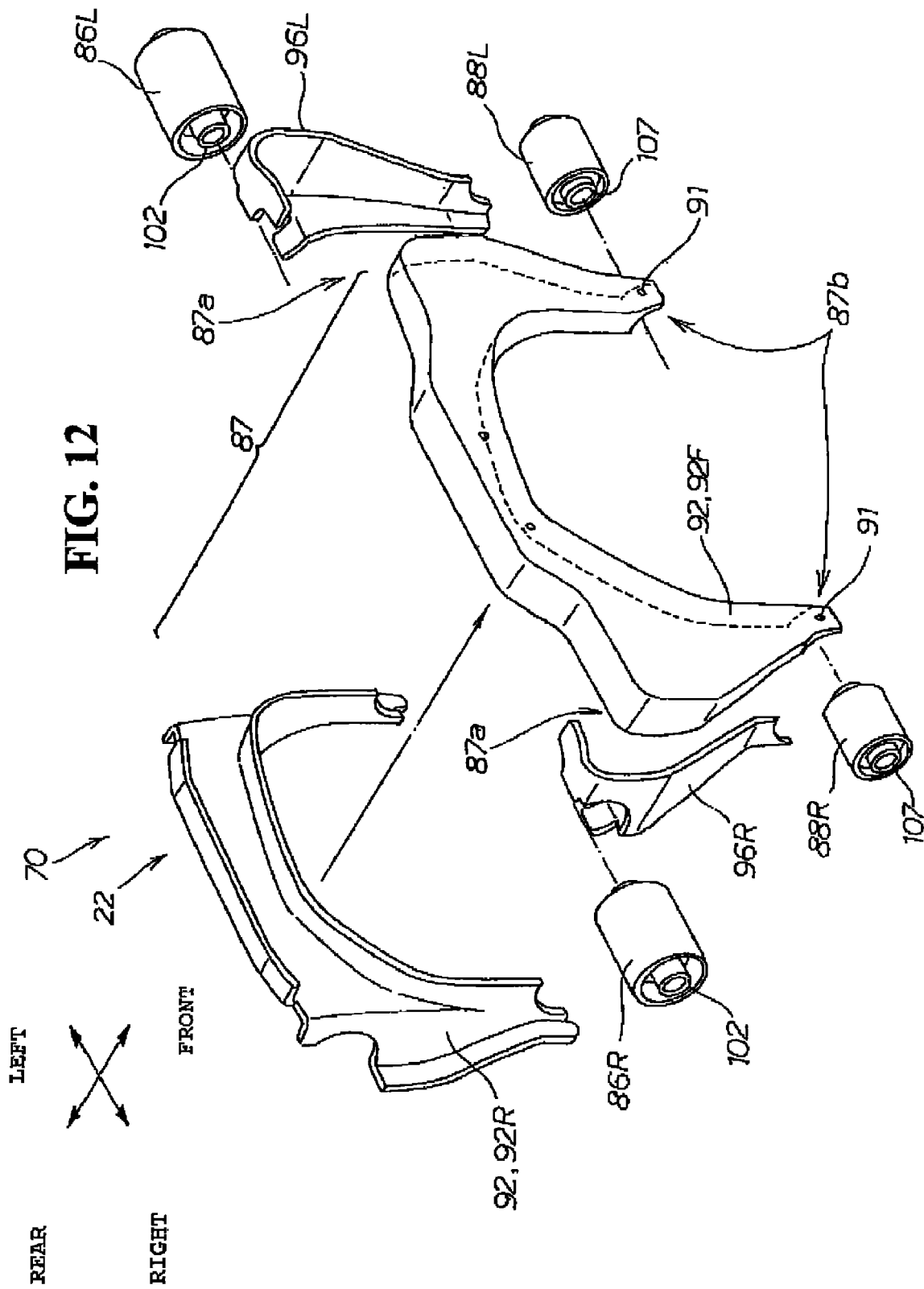

ENGINE SUSPENSION DEVICE FOR MOTORCYCLE

CROSS-REFERENCE TO RELATED APPLICATIONS

This nonprovisional application claims priority under 35 U.S.C. §119(a) on patent application Ser. No. 2007-049799, filed in Japan on Feb. 28, 2007, the entirety of which is incorporated herein by reference.

1. Field of the Invention

The present invention relates to an improvement in an engine suspension device for a motorcycle having a suspension link for pivotably supporting an engine to a body frame.

2. Description of Background Art

Conventionally known is an engine suspension device for a motorcycle having a suspension link provided between a body frame and an engine for pivotably supporting the engine through a pivot shaft (see Japanese Utility Model Laid-open No. 63-98295 (FIG. 4), for example).

Referring to FIG. 4 of Japanese Utility Model Laid-open No. 63-98295, a bracket 1 for supporting an engine (reference numerals used in the description of the background art are the same as those in this publication) has such a structure that a pair of upper and lower plates 3 are joined together at their respective central recesses 2 in an abutting manner. A front support cylinder 4 is welded to the front ends of the upper and lower plates 3. A rear support cylinder 5 is welded to the rear ends of the upper and lower plates 3.

The front and rear support cylinders 4 and 5 extend in the lateral direction of the vehicle, and they serve also as reinforcing members in the lateral direction of the bracket 1. Accordingly, it is difficult to separate each of the front and rear support cylinders 4 and 5 into a pair of right and left cylindrical members, so that it is difficult to reduce the weight of the bracket 1.

In addition, since the bracket 1 is formed by joining the upper and lower plates 3 in an abutting manner, the sectional shape of the bracket 1 is limited to a rectangular shape or an H-shape, for example. Further, the thickness of each of the support cylinders 4 and 5 must be set larger than the thickness of each plate 3, so as to ensure the rigidity of the bracket 1.

It is therefore desirable to develop a technique which can increase the design flexibility of the bracket I and can reduce the weight of the bracket 1.

SUMMARY OF THE INVENTION

It is accordingly an object of the present invention to provide an engine suspension device for a motorcycle which can be increased in design flexibility and can be reduced in weight.

In accordance with a first aspect of the present invention, there is provided an engine suspension device for a motorcycle having a suspension link provided between a body frame and an engine for pivotably supporting the engine through a pivot shaft, the suspension link including a link body composed of a plurality of plate members, a first cylindrical member provided at one end of the link body and connected to the body frame, and a second cylindrical member provided at the other end of the link body and connected to the engine, wherein the first cylindrical member has a pair of first right and left cylindrical members spaced apart from each other in the lateral direction of the motorcycle; the second cylindrical member has a pair of second right and left cylindrical members spaced apart from each other in the lateral direction of the motorcycle; the suspension link further has a right connecting member for connecting the first right cylindrical member and the second right cylindrical member and a left connecting member for connecting the first left cylindrical member and the second left cylindrical member; the right and left connecting members are connected to each other by the link body; and the link body is composed of a front link part and a rear link part connected to each other, and has a U-shape opening upward or downward or an H-shape such that the right and left connecting members are connected at their intermediate portions as viewed in the longitudinal direction of the motorcycle.

In accordance with a second aspect of the present invention, the front link part of the link body is fixed to the right and left connecting members, the first right and left cylindrical members, and the second right and left cylindrical members.

In accordance with a third aspect of the present invention, the front link part of the link body is fixed to the right and left connecting members and the rear link part of the link body in such a manner that an end portion of the front link part overlaps an inner portion of each connecting member and an inner portion of the rear link part.

In accordance with a fourth aspect of the present invention, a drain hole for the removal of water is formed at a lower end portion of any one of the front link part and the rear link part.

In accordance with a fifth aspect of the present invention, a pivotal range limiting portion for limiting the range of pivotal movement of the suspension link is provided between the body frame and one end portion of a support shaft mounted to the second cylindrical member for supporting the engine, and the lateral dimension of the suspension link at its one side portion where the pivotal range limiting portion is provided is set larger than the lateral dimension of the suspension link at the other side portion where the pivotal range limiting portion is not provided.

In accordance with a sixth aspect of the present invention, the suspension link has a left portion and a right portion, and a reinforcing member is provided so as to connect the left portion and the right portion of the suspension link.

In accordance with a seventh aspect of the present invention, each link part is connected at connecting portions to the first and second cylindrical members, and each connecting portion has a sectional U-shape or a sectional I-shape.

According to the first aspect of the present invention, the first right and left cylindrical members are spaced apart from each other in the lateral direction of the vehicle, and the second light and left cylindrical members are also spaced apart from each other in the lateral direction of the vehicle. The first right cylindrical member and the second right cylindrical member are connected to each other by the right connecting member, and the first left cylindrical member and the second left cylindrical member are connected to each other by the left connecting member. Further, the right and left connecting members are connected to each other by the link body.

The link body is composed of a plurality of link parts. Accordingly, in the case that the link body is formed so as to have a sectional U-shape or H-shape, for example, the rigidity of the suspension link can be ensured and the design flexibility of the suspension link can be greatly increased.

In addition, the link body has a U-shape opening upward or downward or an H-shape such that the right and left connecting members are connected at their intermediate portions as viewed in the longitudinal direction of the vehicle. Accordingly, the design flexibility of the suspension link can be further increased.

Since the design flexibility of the suspension link can be increased, the layout flexibility of the vehicle body can be increased.

Further, the first cylindrical member to be connected to the body frame is composed of a pair of right and left cylindrical members spaced apart from each other, and the second cylindrical member to be connected to the engine is also composed of a pair of right and left cylindrical members spaced apart from each other. Accordingly, each of the first and second cylindrical members can be reduced in length. In addition, the design flexibility of the suspension link can be increased. Accordingly, the shape of the suspension link can be optimized and the weight of the suspension link can be reduced.

According to the second aspect of the present invention, the front link part is fixed to the right and left connecting members, the first right and left cylindrical members, and the second right and left cylindrical members. In other words, not only the right and left connecting members, but also the front link part is connected to the first right and left cylindrical members and the second right and left cylindrical members. Accordingly, as compared with the case that the right cylindrical members are connected to each other by only the right connecting member, and the left cylindrical members are connected to each other by only the left connecting member, the rigidity of the suspension link can be more increased.

According to the third aspect of the present invention, the front link part is fixed to the right and left connecting members and the rear link part in such a manner that an end portion of the front link part overlap an inner portion of each connecting member and an inner portion of the rear link part. Accordingly, deformation of the link body due to torsion or the like can be made bard to occur. As a result, the rigidity of the suspension link can be further increased.

According to the fourth aspect of the present invention, a drain hole for the removal of water is formed at a lower end portion of any one of the front link part and the rear link part. Accordingly, the water present in the suspension link can be removed from the drain hole, thereby improving the durability of the suspension link.

According to the fifth aspect of the present invention, the lateral dimension of the suspension link at its one side portion where the pivotal range limiting portion is provided and higher rigidity is therefore required is set larger than the lateral dimension of the suspension link at the other side portion. Accordingly, sufficient rigidity can be provided in the suspension link.

According to the sixth aspect of the present invention, a reinforcing member is provided between the right and left portions of the suspension link. Accordingly, the rigidity of the suspension link can be further increased.

According to the seventh aspect of the present invention, each connecting portion of each link part connected to the first and second cylindrical members has a sectional U-shape or a sectional I-shape. Accordingly, the optimum shape of each link part can be ensured and necessary and sufficient rigidity can be provided in each connecting portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 is an exploded perspective view of the suspension link shown in FIG. 6;

DETAILED DESCRIPTION OF THE PREFERRED EMBODIMENTS

Figure 1:
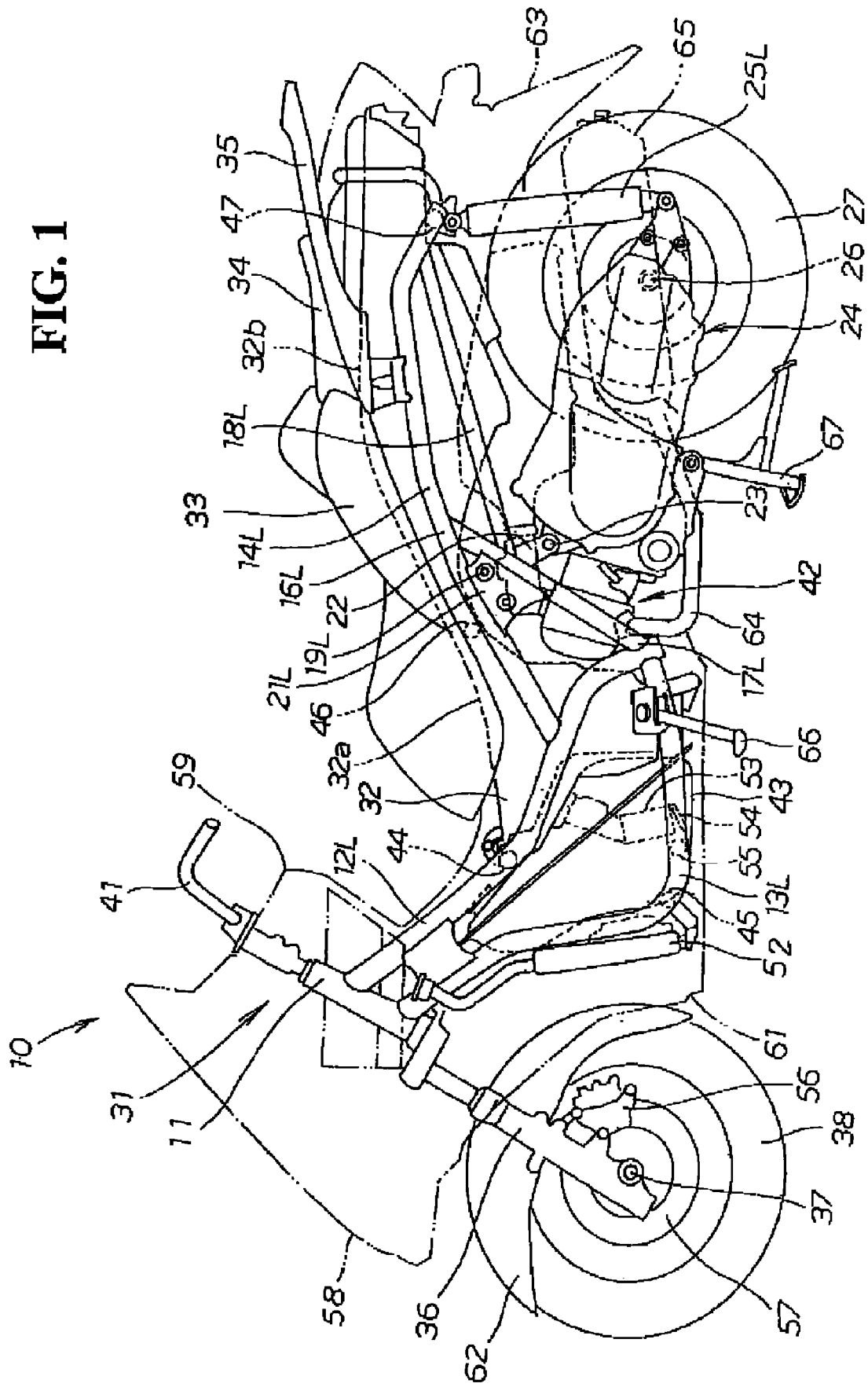
FIG. 1 is a left side view of a motorcycle adopting an engine suspension device according to a first preferred embodiment of the present invention.

Some preferred embodiments of the present invention will now be described with reference to the attached drawings. The orientation of each drawing is the same as that of the reference numerals included therein.

FIG. 1 is a left side view of a motorcycle adopting an engine suspension device according to the present invention. The motorcycle 10 as a scooter type vehicle includes a body frame 31. The body frame 31 includes a head pipe 11, a pair of night and left main frames 12R and 12L (only the left main frame 12L being shown) extending rearward from the upper portion of the head pipe 11 so as to be inclined downward, a pair of right and left down frames 13R and 13L (only the left down frame 13L being shown) extending rearward from the lower portion of the head pipe 11 so as to be inclined downward, next extending downward in the substantially vertical direction, and finally extending rearward in the substantially horizontal direction until being respectively connected to the rear end portions of the main frames 12R and 12L, a pair of right and left seat rails 14R and 14L (only the left seat rail 14L being shown) respectively extending rearward from the rear portions of the main frames 12R and 12L so as to be inclined upward, a pair of right and left middle frames 17R and 17L (only the left middle frame 17L being shown) respectively connecting the seat rails 14R and 14L at their intermediate portions 16R and 16L (only the left intermediate portion 16L being shown) and the main frames 12R and 12L at their rear end portions, a pair of right and left rail stays 18R and 18L (only the left rail stay 18L being shown) respectively connecting the middle frames 17R and 17L at their upper portions and the seat rails 14R and 14L at their rear portions, and a pair of right and left pivot plates 21R and 21L (only the left pivot plate 21L being shown) respectively connecting the seat rails 14R and 14L and the middle frames 17R and 17L and supporting a pair of right and left pivot shafts 19R and 19L (only the left pivot shaft 19L being shown). The motorcycle 10 further includes a suspension link 22 supported through the pivot shafts 19R and 19L to the pivot plates 21R and 21L so as to extend downward, a power unit 24 supported through a support shaft 23 to the suspension link 22 so as to extend rearward, the power unit 24 serving also as a vertically swingable rear swing arm, a rear cushion unit 25L connecting the rear end portion of the power unit 24 and the rear end portion of the seat rail 14L, a rear axle 26 as a drive shaft provided at the rear portion of the power unit 24, a rear wheel 27 mounted on the rear axle 26, a luggage box 32 as a luggage storing portion 29 mounted on the seat rails 14R and 14L, a front seat 33 as a rider seat provided so as to cover the front portion 32a of the luggage box 32, a rear seat 34 as a passenger seat provided so as to cover the rear portion 32b of the luggage box 32, a rear spoiler 35 provided so as to surround the rear seat 34, a front fork 36 steerably mounted to the head pipe 11, a front axle 37 mounted to the lower end portions of the front fork 36, a front wheel 38 mounted to the front axle 37, and a steering handle 41 mounted to the upper end portion of the front fork 36. The power unit 24 includes a water cooled engine 42.

Various members are mounted between the right and left frames constituting the body frame 31 in the following manner.

A fuel tank 43 is located in a region surrounded by the main frames 12R and 12L and the down frames 13R and 13L. A first cross member 44 is connected between the main frames 12R and 12L at a position above the fuel tank 43. A second cross member 45 is connected between the down frames 13R and 13L at a position below the fuel tank 43. A third cross member 46 is connected between the seat rails 14R and 14L in the vicinity of the pivot plates 21R and 21L. A rear cross member 47 is connected between the rear end portions of the seat rails 14R and 14L. Reference numeral 48 identifies a stay.

A radiator unit 52 for cooling the engine 42 is located on the rear side of the front wheel 38 and on the front side of the down frames 13R and 13L.

The fuel tank 43 contains a fuel pump 53, a strainer 54 located below the fuel pump 53 for removing foreign matter such as water and dust from the fuel stored in the fuel tank 43, and a flow sensor 55 for detecting a fuel level in the fuel tank 43.

The motorcycle 10 further includes a front disc brake unit 56, a front brake disc 57, a front cowl 58 for covering the front portion of the vehicle, an inner cover 59 continuously connected to the front cowl 58 for covering the front portion of the vehicle including the head pipe 11, a main cowl 61 for covering the side portion of the vehicle, a front fender 62, a rear fender 63, an exhaust pipe 64 extending from the power unit 24, a muffler 65 connected to the rear end portion of the exhaust pipe 64, a side stand 66, a main stand 67, and a secondary air reed valve 68 located on one side of the engine 42 and connected to the exhaust pipe 64 and an intake pipe (not shown).

Figure 2:
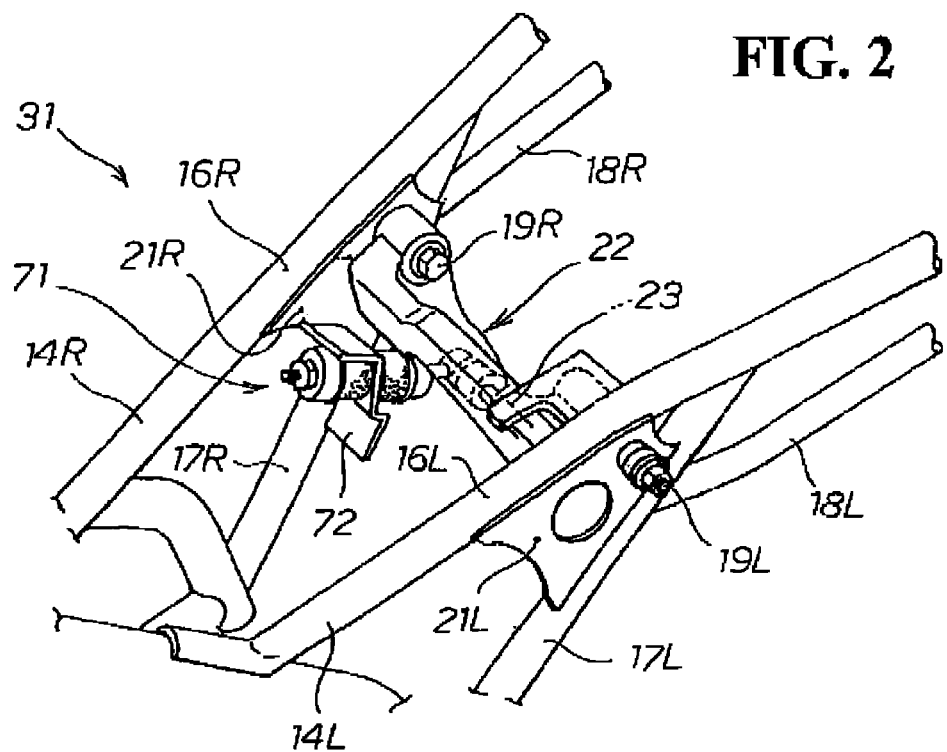
FIG. 2 is a perspective view for illustrating the engine suspension device according to the first preferred embodiment.

FIG. 2 is a perspective view for illustrating the engine suspension device according to the first preferred embodiment of the present invention. The engine suspension device 70 is provided between the body frame 31 and the engine 42 to pivotably support the engine 42 through the pivot shafts 19R and 19L.

As shown in FIG. 2, the left pivot plate 21L is connected between the left seat rail 14L and the left middle frame 17L in the vicinity of the intermediate portion 16L of the left seat rail 14L. Similarly, the right pivot plate 21R is connected between the light seat rail 14R and the right middle frame 17R in the vicinity of the intermediate portion 15R of the right seat rail 14R. The suspension link 22 is pivotably mounted between the right and left pivot plates 21R and 21L through the night and left pivot shafts 19R and 19L. The power unit 24 (see FIG. 1) including the engine 42 (see FIG. 1) is supported through the support shaft 23 extending across the suspension link 22.

Further, a pivotal range limiting portion 71 for limiting the range of pivotal movement of the suspension link 22 is provided between the body frame 31 and one end portion of the support shaft 23 supporting the engine 42.

Figure 3:
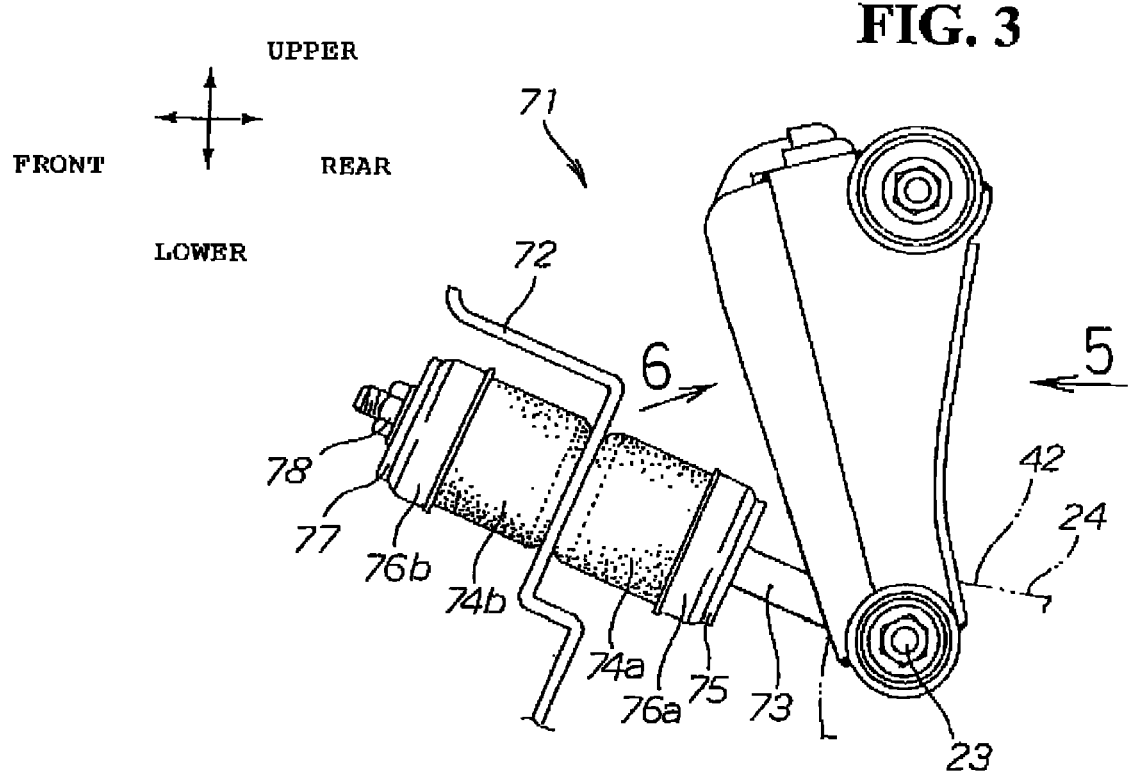
FIG. 3 is a side view for illustrating the engine suspension device according to the first preferred embodiment.
Figure 4:
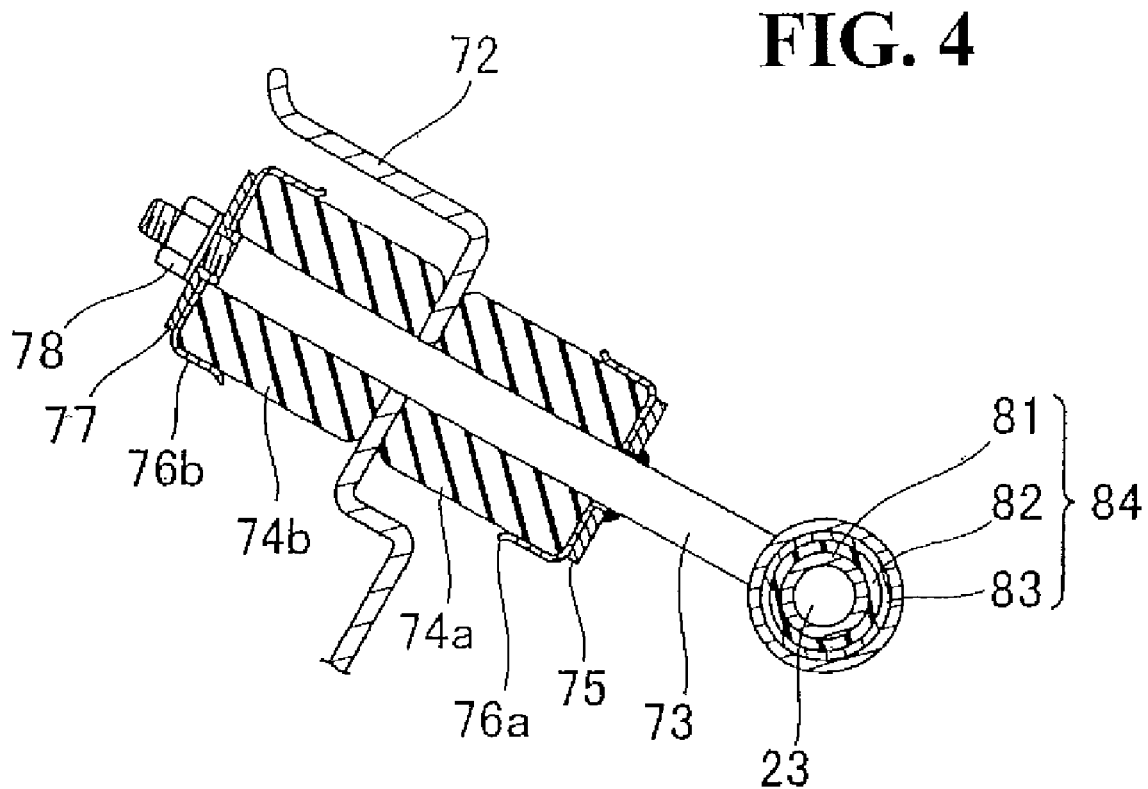
FIG. 4 is a sectional view for illustrating the engine suspension device according to the first preferred embodiment.

FIG. 3 is a side view for illustrating the engine suspension device according to the first preferred embodiment of the present invention, and FIG. 4 is a sectional view for illustrating the engine suspension device according to the first preferred embodiment of the present invention. The pivotal range limiting portion 71 in the engine suspension device will now be described with reference to FIGS. 3 and 4.

The pivotal range limiting portion 71 includes a bracket 72 fixed to the body frame 31 and a pivotal range limiting shaft 73 radially extending from the support shaft 23 for the power unit 24 including the engine 42 and mounted through a pair of rubber bushings 74a and 74b to the bracket 72. Vibrations or the like of the support shaft 23 can be absorbed by the rubber bushings 74a and 74b.

More specifically, a stop member 75 as a flange member is fixed to the pivotal range limiting shaft 73. A cup member 76a, the rubber bushing 74a, the bracket 72, the rubber bushing 74b, a cup member 76b, and a washer 77 are mounted on the pivotal range limiting shaft 73 in this order toward the stop member 75. A nut member 78 is tightened to the pivotal range limiting shaft 73 to thereby firmly hold the rubber bushings 74a and 74b, the cup members 76a and 76b, and the bracket 72.

The cup members 76a and 76b function to hold the opposite end portions of the rubber bushings 74a and 74b. That is, the cup member 76a is interposed between the stop member 75 and the rubber bushing 74a so as to hold one end portion of the rubber bushing 74a, and the cup member 76b is interposed between the washer 77 and the rubber bushing 74b so as to hold one end portion of the rubber bushing 74b. With this arrangement, a force acting on the support shaft 23 can be uniformly transmitted through the pivotal range limiting shaft 73 to the opposite end portions of the rubber bushings 74a and 74b.

As shown in FIG. 4, a shock absorbing portion 84 is also provided between the support shaft 23 and the pivotal range limiting shaft 73. The shock absorbing portion 84 is composed of an inner pipe 81, a rubber bushing 82, and an outer pipe 83.

Figure 5:
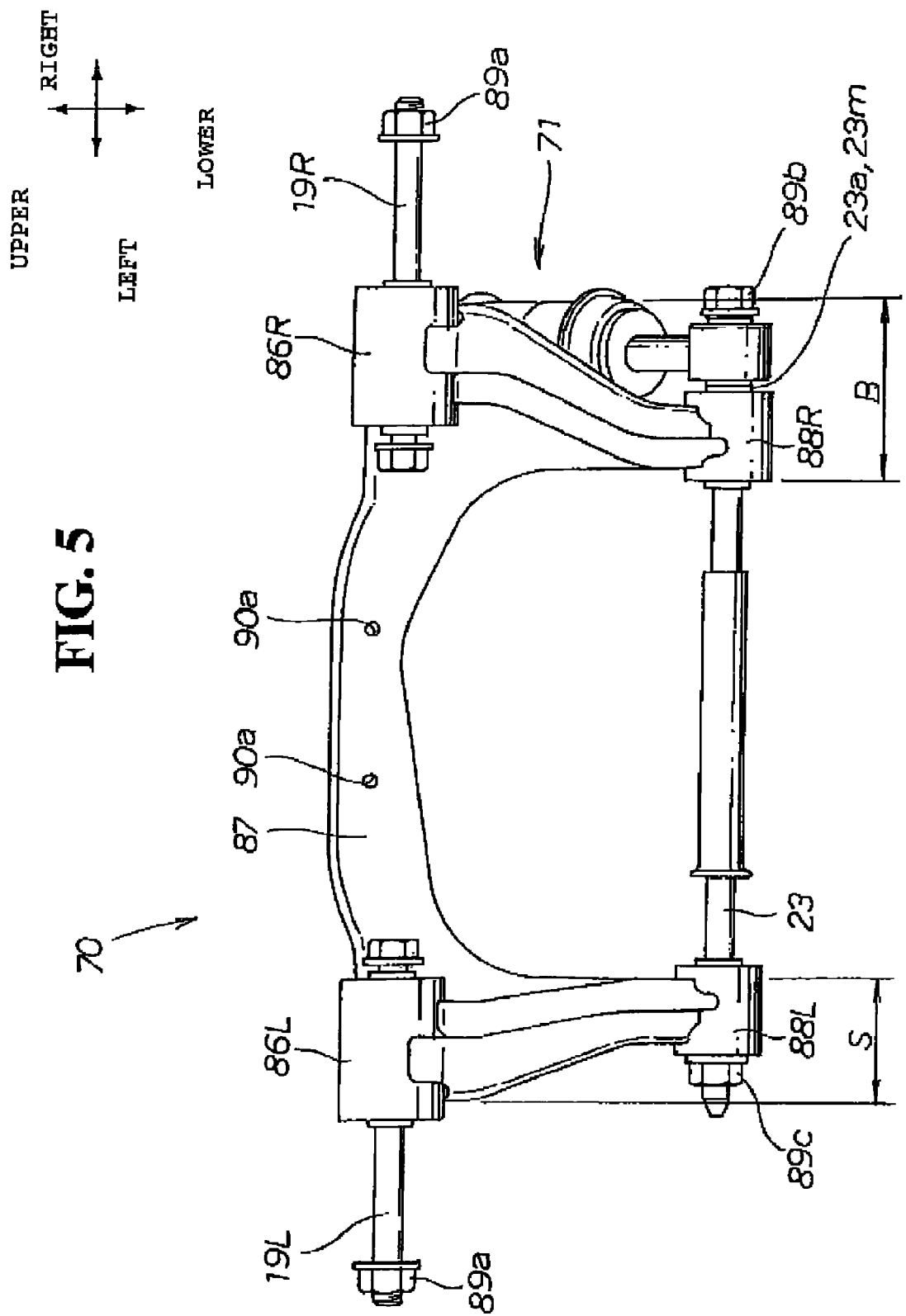
FIG. 5 is a rear elevation view for illustrating the engine suspension device according to the first preferred embodiment.

FIG. 5 is a rear elevation corresponding to a view taken in the direction shown by an arrow 5 in FIG. 3 for illustrating the engine suspension device according to the first preferred embodiment of the present invention. In FIG. 5, reference numeral 70 generally identifies the engine suspension device. The engine suspension device 70 includes the right and left pivot shafts 19R and 19L mentioned above with reference to FIG. 2, a pair of right and left cylindrical members 86R and 86L respectively rotatably mounted on the right and left pivot shafts 19R and 19L, a link body 87 for connecting the right and left cylindrical members 86R and 86L, the link body 87 having an inverted U-shape opening downward as viewed in rear elevation, a pair of right and left cylindrical members 88R and 88L respectively mounted to the right and left lower end portions of the link body 87, the support shaft 23 rotatably inserted through the right and left cylindrical members 88R and 88L for supporting the engine 42 (see FIG. 1), and the pivotal range limiting portion 71 mounted on the support shaft 23 at its right end portion 23m for limiting the range of pivotal movement of the link body 87.

Reference numerals 89a identify tightening nuts, and reference numeral 89c identifies a tightening nut engaged with the support nut 23 as a tightening bolt 89b. Reference numerals 90a identify small holes.

As shown in FIG. 5, the right and left cylindrical members 86R and 86L are spaced apart from each other in the lateral direction of the vehicle and connected through the pivot shafts 19R and 19L, respectively, to the body frame 31. On the other hand, the right and left cylindrical members 88R and 88L are spaced apart from each other in the lateral direction of the vehicle and connected through the support shaft 23 to the engine 42. [0037]

The pivotal range limiting portion 71 is provided between the night end portion 23m as one end portion 23a of the support shaft 23 and the body frame 31 (see FIG. 2). The lateral dimension B of the suspension link 22 at its one side portion (right side portion) where the pivotal range limiting portion 71 is provided is set larger than the lateral dimension S of the suspension link 22 at its other side portion (left side portion) where the pivotal range limiting portion 71 is not provided. Accordingly, sufficient rigidity can be provided in the suspension link 22.

Figure 6:
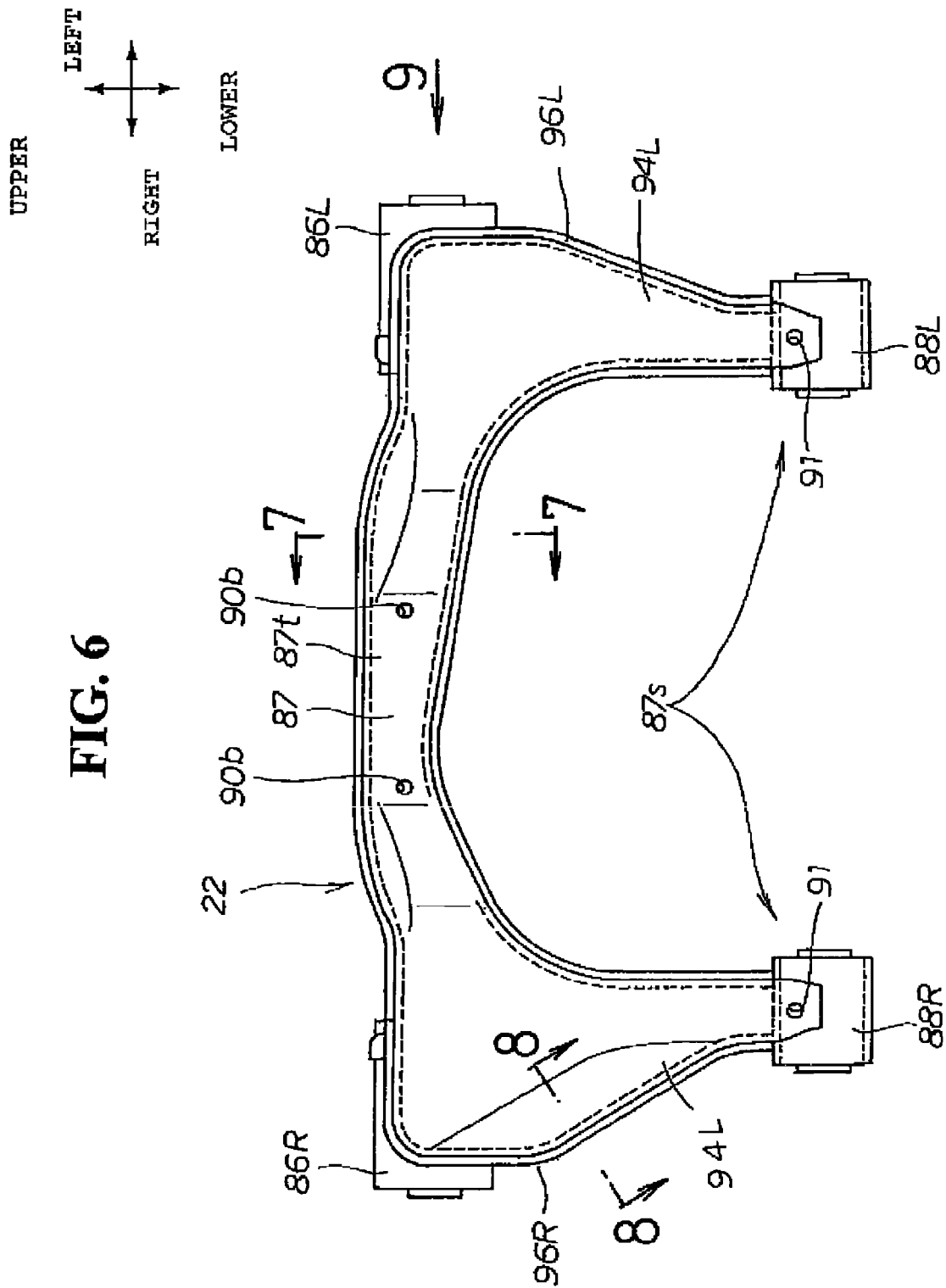
FIG. 6 is a front elevation view for illustrating a suspension link of the engine suspension device according to the first preferred embodiment.

FIG. 6 is a front elevation corresponding to a view taken in the direction shown by an arrow 6 in FIG. 3 for illustrating the suspension link 22. The suspension link 22 is a member obtained by removing the pivot shafts 19R and 19L, the support shaft 23, and the pivotal range limiting portion 71 from the engine suspension device 70.

Accordingly, the suspension link 22 includes the link body 87, the right and left cylindrical members 86R and 86L, and the right and left cylindrical members 88R and 88L. The suspension link 22 is formed at its two lower end portions 22b with two drain holes 91 for the removal of water. In this preferred embodiment, these drain holes 91 are formed at two lower end portions 87s of the link body 87.

Reference numerals 90b identify small holes.

Figure 7:
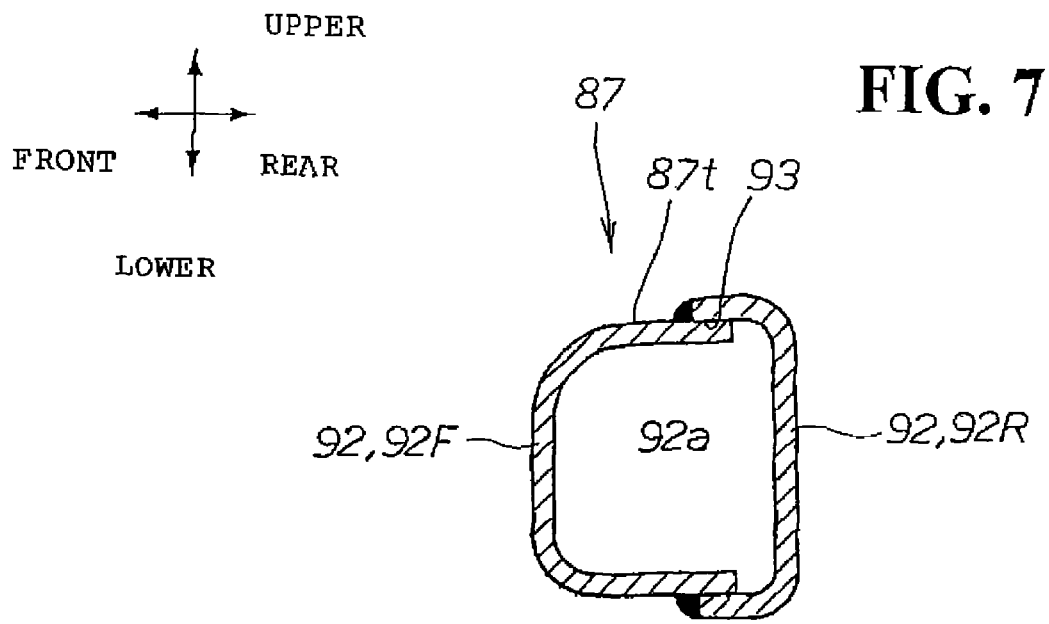
FIG. 7 is a cross section taken along the line 7-7 in FIG. 6.

FIG. 7 is a cross section taken along the line 7-7 in FIG. 6. As shown in FIG. 7, the link body 87 is composed of a plurality of link parts 92 as a plurality of plate members connected to each other. In this preferred embodiment, the link body 87 is composed of a front link part 92F as one of the link parts 92 and a rear link part 92R as the other link part 92.

At a substantially central portion 87t (see also FIG. 6) of the link body 87, the front link part 92F has a sectional U-shape opening rearward and the rear link part 92R also has a sectional U-shape opening frontward, wherein the front and rear link parts 92F and 92R are fixed to each other in such a manner that the front link part 92F is fitted at its opposite end portions 92a with the inner portion 93 of the rear link part 92R. That is, the opposite end portions 92a of the front link part 92F overlap the inner portion 93 of the rear link part 92R.

Thus, the front and rear link parts 92F and 92R are fixed to each other in such a manner that the opposite end portions 92a of the front link part 92F overlap the inner portion 93 of the rear link part 92R. With this structure, deformation of the link body 87 due to torsion or the like can be made hard to occur. As a result, the rigidity of the suspension link 22 can be further increased.

Figure 8:
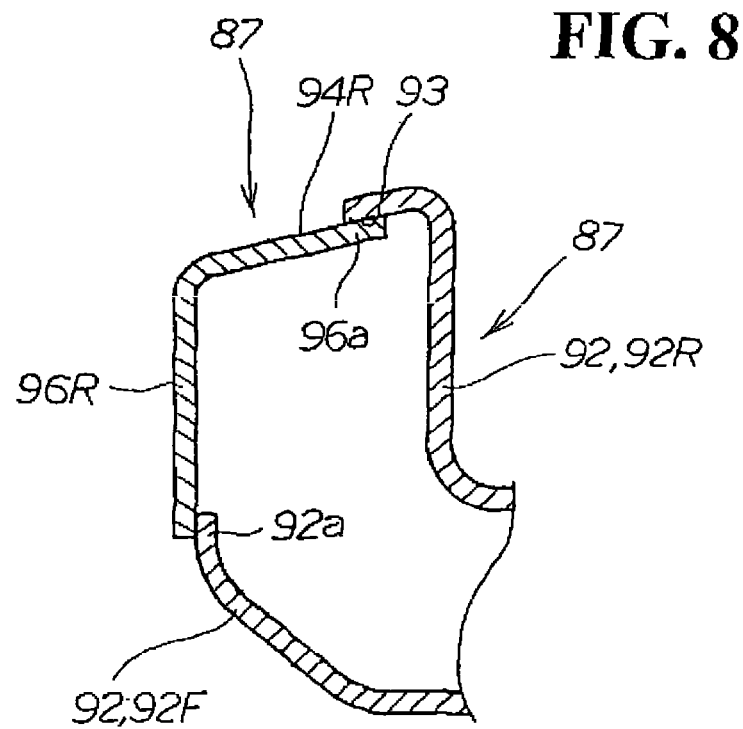
FIG. 8 is a cross section taken along the line 8-8 in FIG. 6.

FIG. 8 is a cross section taken along the line 8-8 in FIG. 6. As shown in FIG. 8, a right connecting member 96R for connecting the right cylindrical member 86R and the right cylindrical member 88R is mounted to a right arm portion 94R (see FIG. 6) of the link body 87.

More specifically, the right connecting member 96R is fixed to the front and rear link parts 92F and 92R in such a manner that one end portion 92a of the front link part 92F overlap the inner portion of the connecting member 92R and that one end portion 96a of the connecting member 96R overlaps the inner portion 93 of the rear link part 92R.

The structure of a left arm portion 94L and a left connecting member 96L (see FIG. 6) of the link body 87 is similar to that of the right arm portion 94R and the right connecting member 96R mentioned above, so the description thereof will be omitted herein.

The plate thickness of the front and rear link parts 92F and 92R and the plate thickness of the right and left connecting members 96R and 96L may be set to arbitrary thicknesses. However, the plate thickness of each member of the suspension link 22 is preferably set to a thickness satisfying various characteristic values related to rolling, yawing, and pitching as required by the suspension link 22.

Referring again to FIG. 6, the drain holes 91 for the removal of water from the inside of the suspension link 22 are formed at two lower end portions 92b of the front link part 92F. Accordingly, the water present in the suspension link 22 can be removed from the drain holes 91, thereby improving the durability of the suspension link 22.

Although the drain holes 91 are formed at the lower end portions 92b of the front link part 92F in this preferred embodiment, the drain holes 91 may be formed at the lower end portions of the rear link part 92R.

Figure 9:
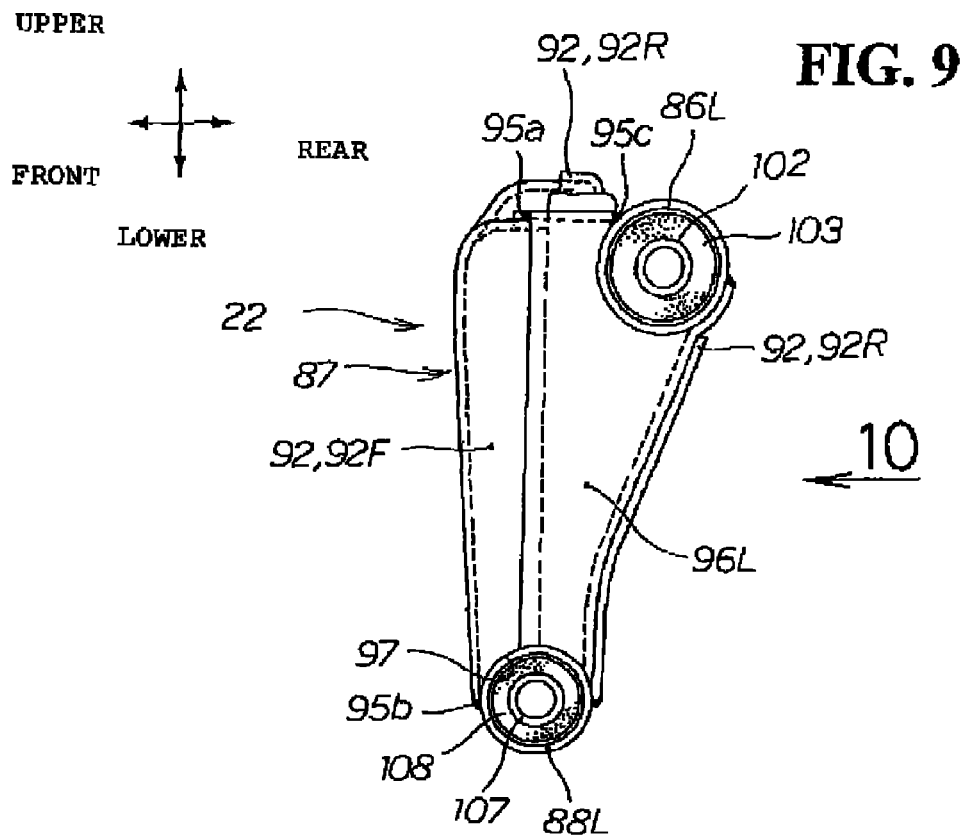
FIG. 9 is a view taken in the direction shown by an arrow 9 in FIG. 6.
Figure 10:
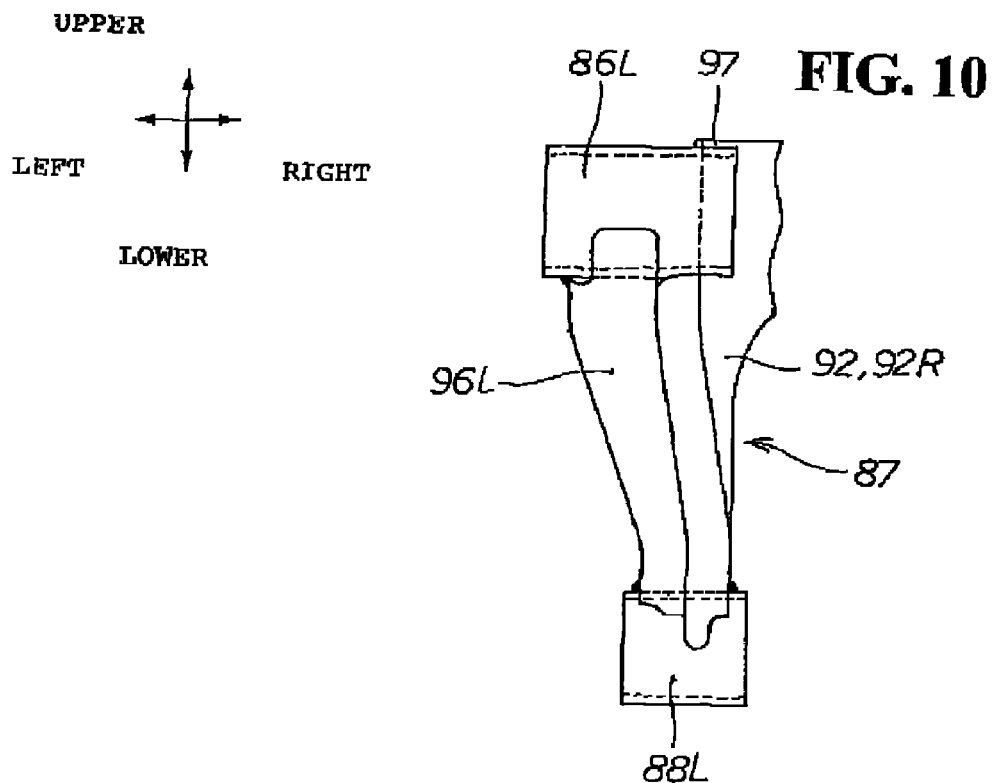
FIG. 10 is a partially cutaway view taken in the direction shown by an arrow 10 in FIG. 9.

FIG. 9 is a view taken in the direction shown by an arrow 9 in FIG. 6, and FIG. 10 is a partially cutaway view taken in the direction shown by an arrow 10 in FIG. 9. As shown in FIGS. 9 and 10, the left cylindrical member 86L and the left cylindrical member 88L are connected to each other by the left connecting member 96L. Further, the front and rear link parts 92F and 92R constituting the link body 87 are mounted to the left connecting member 96L.

As mentioned above, the link body 87 is composed of the plural link parts 92 (the first and rear link parts 92F and 92R in this preferred embodiment) connected together, and each link part 92 has a sectional U-shape in a downwardly opening direction. Each link part 92 is connected at portions 97 to the cylindrical members 86L and 88L, and each connecting portion 97 has a sectional U-shape or a sectional I-shape.

The front link part 92F of the link body 87 is fixed at a welded portion 95a to the connecting member 96L, fixed at a welded portion 95b to the cylindrical member 88L, and fixed at a welded portion 95c to the cylindrical member 86L. In other words, not only the connecting member 96L, but also the front link part 92F is connected to the cylindrical members 86L and 88L. Accordingly, as compared with the case that the cylindrical members 86L and 88L are connected to each other by only the connecting member 96L, the rigidity of the suspension link 22 can be more increased.

The structure and operation of the right connecting member 96R and its peripheral portion are similar to those of the left connecting member 96L and its peripheral portion mentioned above, so the description thereof will be omitted herein.

Figure 11:
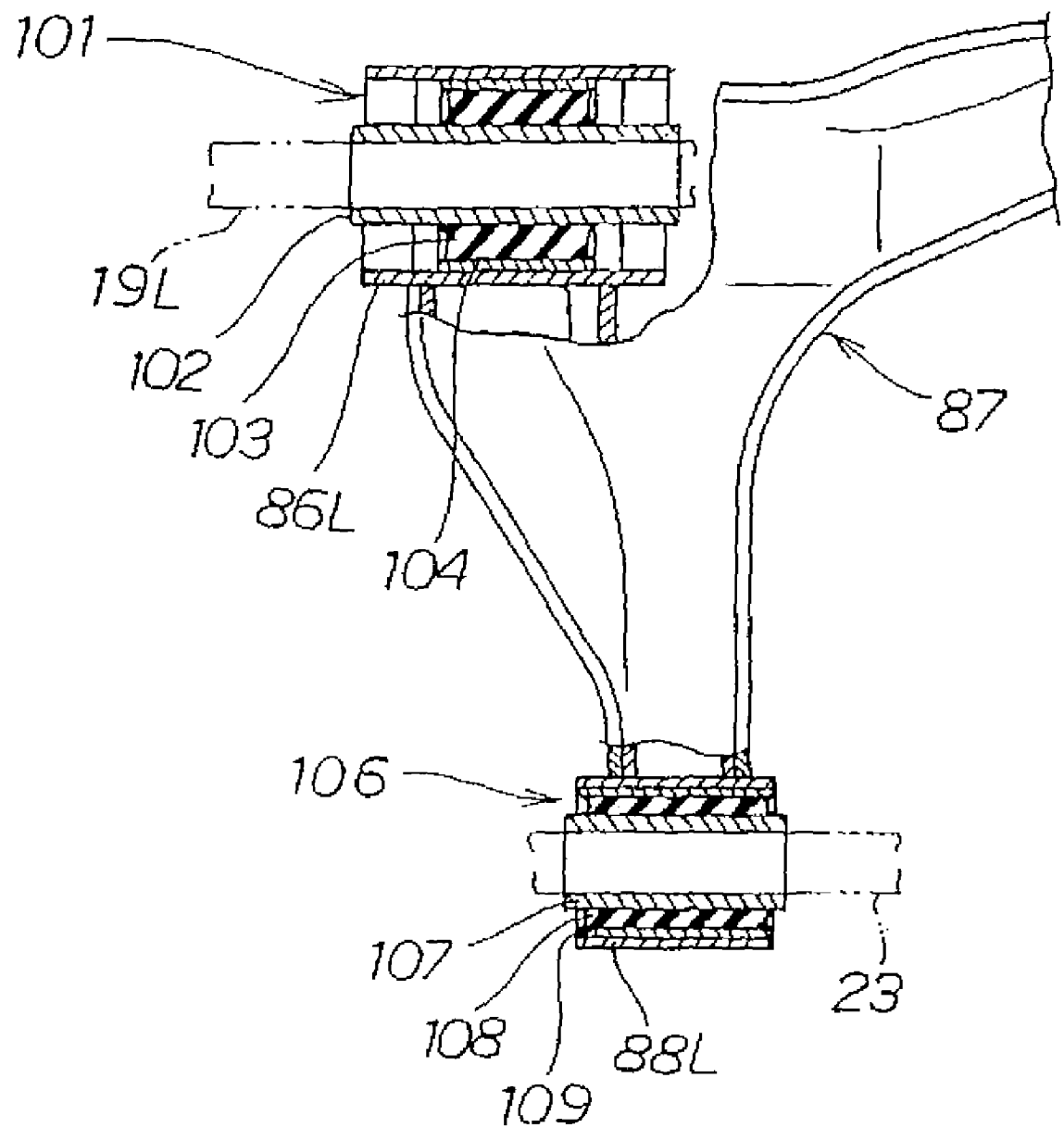
FIG. 11 is a sectional view for illustrating the insertion of bushing units in the left cylindrical members.

FIG. 11 is a sectional view for illustrating the insertion of bushing units 101 and 106 in the cylindrical members 86L and 88L.

As shown in FIG. 11, the bushing unit 101 is composed of an inner pipe 102 in which the pivot shaft 19L is inserted, a bushing 103 fitted to the outer circumference of the inner pipe 102, and an outer pipe 104 fitted to the outer circumference of the bushing 103. The outer circumference of the outer pipe 104 is fitted to the inner circumference of the cylindrical member 86L. [0049]

Similarly, the bushing unit 106 is composed of an inner pipe 107 in which the support shaft 23 is inserted, a bushing 108, and an outer pipe 109. The outer circumference of the outer pipe 109 is fitted to the inner circumference of the cylindrical member 88L.

In this figure, the configuration of the left side of the suspension link 22 is explained. Although not shown, similar bushing units are provided in the right side.

FIG. 12 is an exploded perspective view of the suspension link 22. As shown in FIG. 12, the suspension link 22 includes the link body 87 constituted of the link parts 92 as a plurality of plate members, the right and left cylindrical members 86R and 86L provided at the right and left upper end portions 87a of the link body 87 as one end thereof and connected to the body frame 31, and the right and left cylindrical members 88R and 88L provided at the right and left lower end portions 87b of the link body 87 as the other end thereof and connected to the engine 42 (shown in FIG. 1).

The suspension link 22 further includes the left connecting member 96L for connecting the left cylindrical members 86L and 88L to each other and the right connecting member 96R for connecting the right cylindrical members 86R and 88R to each other. Further, the right and left connecting members 96R and 96L are connected to each other by the link body 87.

The operation of the engine suspension device 70 will now be described.

The right and left cylindrical members 86R and 86L connected to the body frame 31 are spaced apart from each other in the lateral direction of the vehicle, and the right and left cylindrical members 88R and 88L connected to the engine 42 are spaced apart from each other in the lateral direction of the vehicle. Further, the left cylindrical members 86L and 88L are connected to each other by the left connecting member 96L, and the right cylindrical members 86R and 88R are connected to each other by the right connecting member 96R. Further, the right and left connecting members 96R and 96L are connected to each other by the link body 87.

While the link body 87 is composed of the two link parts 92F and 92R in this preferred embodiment, the link body 87 may be composed of three or more link parts.

The link body 87 is composed of a plurality of link parts. Accordingly, in the case that the link body 87 is formed so as to have a sectional U-shape or H-shape, for example, the rigidity of the suspension link 22 can be ensured and the design flexibility of the suspension link 22 can be greatly increased.

Since the design flexibility of the suspension link 22 can be increased, the layout flexibility of the vehicle body can be increased.

Further, since the cylindrical members 86R and 86L are spaced apart from each other and the cylindrical members 88R and 88L are spaced apart from each other, the cylindrical member to be connected to the body frame and the cylindrical member to be connected to the engine can be reduced in length. In addition, the design flexibility of the suspension link 22 can be increased. Accordingly, the shape of the suspension link 22 can be optimized and the weight of the suspension link 22 can be reduced.

Figure 13A:
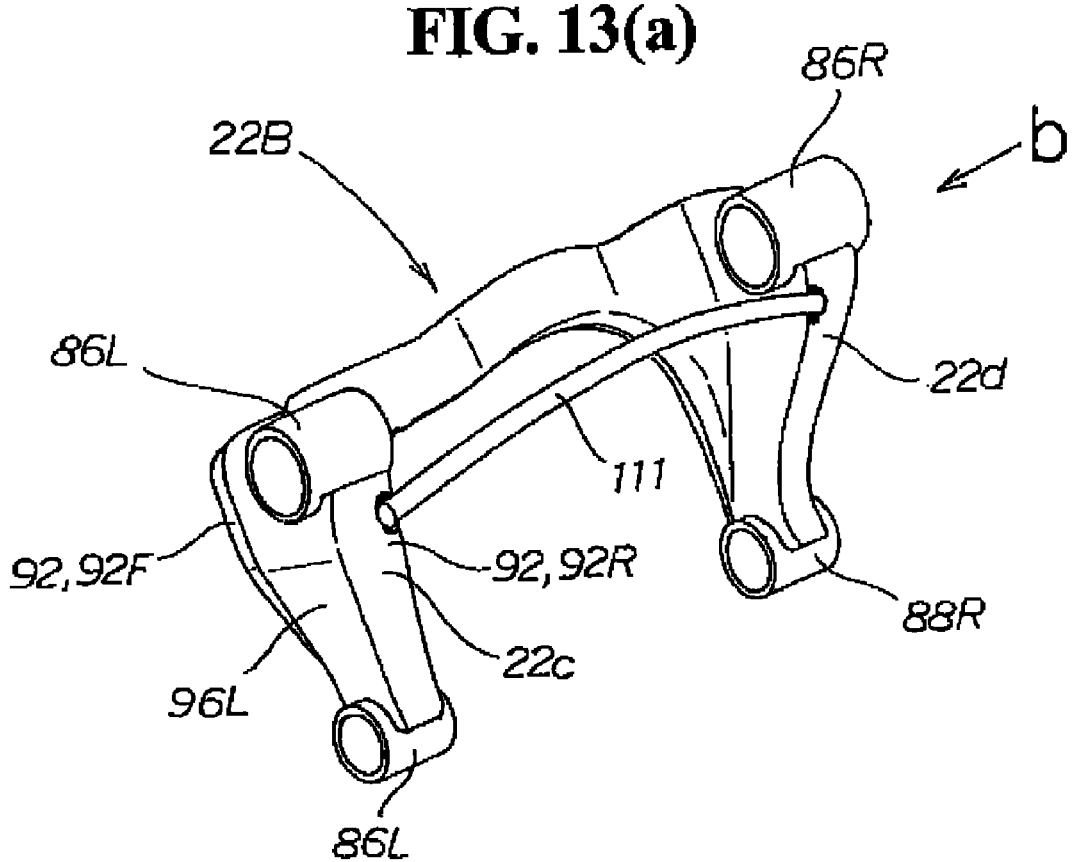
FIG. 13(a) is a perspective view of a suspension link according to a second preferred embodiment of the present invention.
Figure 13B:
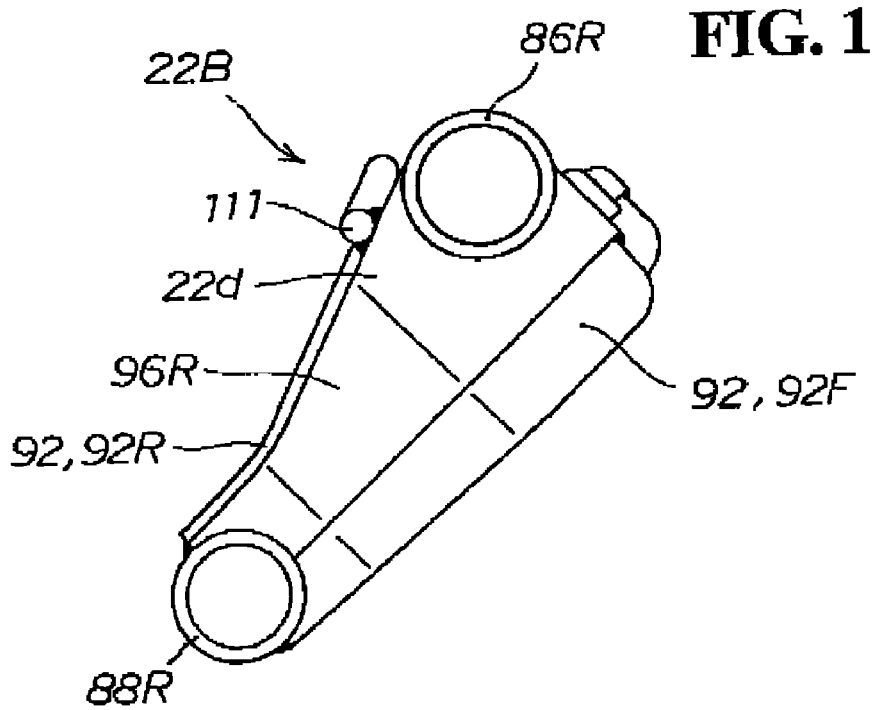
FIG. 13(b) is a view taken in the direction shown by an arrow b in FIG. 13(a)

FIGS. 13(a) and 13(b) are perspective views of a suspension link 22B according to a second preferred embodiment of the present invention.

As shown in FIG. 13(a), the suspension link 22B has a left portion 22C and a right portion 22d, and a reinforcing member 111 is additionally provided so as to connect the left portion 22c and the right portion 22d of the suspension link 22B.

Since the right and left portions 22d and 22c of the suspension link 22B are connected to each other by the reinforcing member 111, the rigidity of the suspension link 22B can be further increased.

As shown in FIG. 13(b), the reinforcing member 111 is located below the cylindrical member 86R in the vicinity thereof.

More specifically, the plate thickness of the suspension link 22B is set smaller than that of the suspension link 22 according to the first preferred embodiment, and a metal elastic member having a sectional circular shape as the reinforcing member 111 extends between the right and left connecting members 96R and 96L. With this arrangement, the suspension link 22B having a high rolling characteristic value and a low yawing characteristic value can be obtained to thereby improve the ride comfort and drivability of the vehicle.

Figure 14:
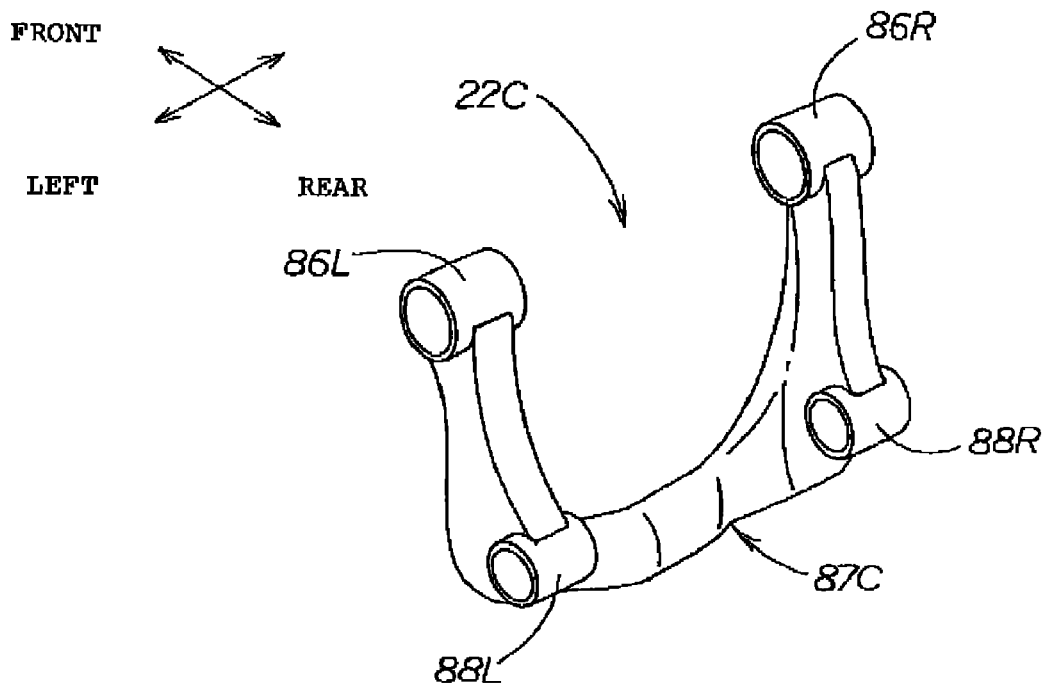
FIG. 14 is a perspective view of a suspension link according to a third preferred embodiment of the present invention.

FIG. 14 is a perspective view of a suspension link 22C according to a third preferred embodiment of the present invention. The suspension link 22C is different from the suspension link 22 according to the first preferred embodiment in that it has a U-shape opening upward as viewed in the longitudinal direction of the vehicle. The other configuration is similar to that of the suspension link 22.

Figure 15:
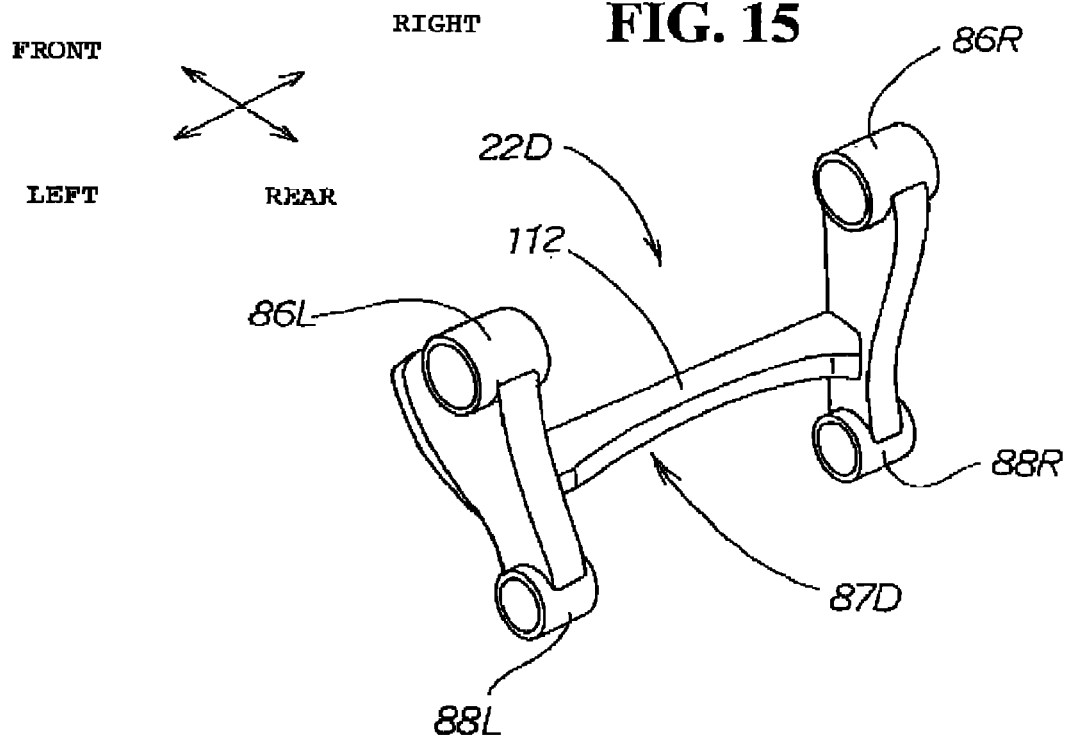
FIG. 15 is a perspective view of a suspension link according to a fourth preferred embodiment of the present invention.

FIG. 15 is a perspective view of a suspension link 22D according to a fourth preferred embodiment of the present invention. The suspension link 22D is different from the suspension link 22 according to the first preferred embodiment in that it has an H-shape as viewed in the longitudinal direction of the vehicle such that a cross member 112 extends between the right and left connecting members 96R and 96L at their intermediate portions. The other configuration is similar to that of the suspension link 22.

As shown in FIG. 14, the suspension link 22C has a link body 87C having a U-shape opening upward as viewed in the longitudinal direction of the vehicle. Further, as shown in FIG. 15, the suspension link 22D has a link body 87D having an H-shape as viewed in the longitudinal direction of the vehicle such that the right and left connecting members 96R and 96L are connected to each other at their intermediate portions. Accordingly, the design flexibility of the suspension links 22C and 22D can be further increased.

According to the first aspect of the present invention, the front link part may be fixed to the first and second cylindrical members, but not fixed to the right and left connecting members.

Further, the front link part may not overlap the connecting members and the rear link part, but may be butt-jointed to the connecting members and the rear link part.

Further, the drain hole formed at the lower end portion of the link body may be omitted.

Further, the lateral dimension of the suspension link at one side portion where the pivotal range limiting portion is provided may be set equal to the lateral dimension of the suspension link at the other side portion where the pivotal range limiting portion is not provided.

The present invention is suitably applicable to an engine suspension device for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine suspension device for a motorcycle having a suspension link provided between a body frame and an engine for pivotably supporting the engine through a pivot shaft, said suspension link comprising:
   a link body composed of a plurality of plate members;
   a first cylindrical member provided at one end of said link body and connected to the body frame, said first cylindrical member includes a pair of first right and left cylindrical members spaced apart from each other in the lateral direction of the motorcycle;
   a second cylindrical member provided at the other end of said link body and connected to the engine, said second cylindrical member includes a pair of second right and left cylindrical members spaced apart from each other in the lateral direction of the motorcycle;
   a right connecting member for connecting said first right cylindrical member and said second right cylindrical member; and
   a left connecting member for connecting said first left cylindrical member and said second left cylindrical member,
   wherein said right and left connecting members are connected to each other by said link body, and said link body is composed of a front link part and a rear link part connected to each other, said link body having a U-shape opening upward or downward or an H-shape such that said right and left connecting members are connected at intermediate portions thereof as viewed in a longitudinal direction of said motorcycle.

2. The engine suspension device according to claim 1, wherein said front link part of said link body is fixed to said right and left connecting members, said first right and left cylindrical members, and said second right and left cylindrical members.

3. The engine suspension device according to claim 2, wherein said front link part of said link body is fixed to said right and left connecting members and said rear link part of said link body in such a manner that an end portion of said front link part overlaps an inner portion of each connecting member and an inner portion of said rear link part.

4. The engine suspension device according to claim 1, wherein said front link part of said link body is fixed to said right and left connecting members and said rear link part of said link body in such a manner that an end portion of said front link part overlaps an inner portion of each connecting member and an inner portion of said rear link part.

5. The engine suspension device according to claim 1, wherein a drain hole for the removal of water is formed at a lower end portion of any one of said front link part and said rear link part.

6. The engine suspension device according to claim 1, wherein a pivotal range limiting portion for limiting the range of pivotal movement of said suspension link is provided between said body frame and one end portion of a support shaft mounted to said second cylindrical member for supporting said engine, and the lateral dimension of said suspension link at one side portion where said pivotal range limiting portion is provided is set larger than the lateral dimension of said suspension link at another side portion where said pivotal range limiting portion is not provided.

7. The engine suspension device according to claim 1, wherein said suspension link has a left portion and a right portion, and a reinforcing member is provided so as to connect said left portion and said right portion of said suspension link.

8. The engine suspension device according to claim 1, wherein each link part is connected at connecting portions to said first and second cylindrical members, and each connecting portion has a sectional U-shape or a sectional I-shape.

9. The engine suspension device according to claim 1, wherein said link body has a downward U-shape.

10. A suspension link for a motorcycle, comprising:
    a link body composed of a plurality of plate members;
    a pair of first right and left cylindrical members spaced apart from each other in a lateral direction of the motorcycle;
    a pair of second right and left cylindrical members spaced apart from each other in the lateral direction of the motorcycle;
    a right connecting member for connecting said first right cylindrical member and said second right cylindrical member; and
    a left connecting member for connecting said first left cylindrical member and said second left cylindrical member,
    wherein said right and left connecting members are connected to each other by said link body, said link body having a U-shape opening upward or downward or an H-shape such that said right and left connecting members are connected at intermediate portions thereof as viewed in a longitudinal direction of said motorcycle.

11. The suspension link according to claim 10, wherein said link body is composed of a front link part and a rear link part connected to each other, said front link part of said link body is fixed to said right and left connecting members, said first right and left cylindrical members, and said second right and left cylindrical members.

12. The suspension link according to claim 11, wherein said link body is composed of a front link part and a rear link part connected to each other, said front link part of said link body is fixed to said right and left connecting members and said rear link part of said link body in such a manner that an end portion of said front link part overlaps an inner portion of each connecting member and an inner portion of said rear link part.

13. The suspension link according to claim 10, wherein said link body is composed of a front link part and a rear link part connected to each other, said front link part of said link body is fixed to said right and left connecting members and said rear link part of said link body in such a manner that an end portion of said front link part overlaps an inner portion of each connecting member and an inner portion of said rear link part.

14. The suspension link according to claim 10, wherein said link body is composed of a front link part and a rear link part connected to each other, and a drain hole for the removal of water is formed at a lower end portion of any one of said front link part and said rear link part.

15. The suspension link according to claim 10, wherein a pivotal range limiting portion for limiting the range of pivotal movement of said suspension link is provided between a body frame of the motorcycle and one end portion of a support shaft mounted to said second cylindrical member for supporting an engine of the motorcycle, and a lateral dimension of said suspension link at one side portion where said pivotal range limiting portion is provided is set larger than a lateral dimension of said suspension link at another side portion where said pivotal range limiting portion is not provided.

16. The suspension link according to claim 10, wherein said suspension link has a left portion and a right portion, and a reinforcing member is provided so as to connect said left portion and said right portion of said suspension link.

17. The suspension link according to claim 10, wherein said link body is composed of a front link part and a rear link part connected to each other, and each link part is connected at connecting portions to said first and second cylindrical members, and each connecting portion has a sectional U-shape or a sectional I-shape.

18. The suspension link according to claim 10, wherein said link body has a downward U- shape.

* * * * *